Feb. 5, 1946. M. E. SAVOIE Re. 22,717
ERASER FOR MECHANICAL PENCILS
Original Filed April 5, 1943
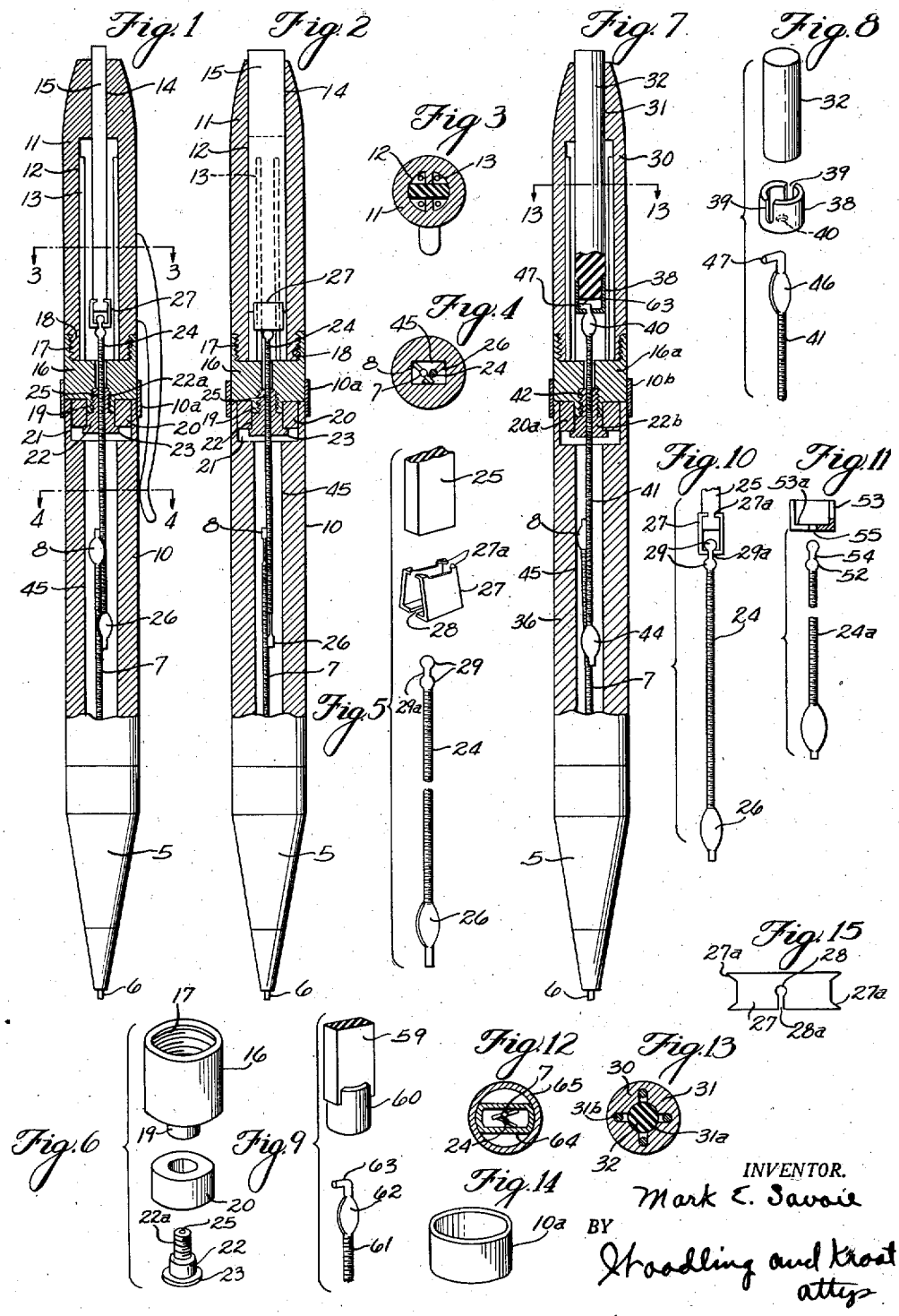
INVENTOR.
Mark E. Savoie
BY
Stoddling and Kroot
attys Reissued Feb. 5, 1946

Re. 22,717

UNITED STATES PATENT OFFICE 22,717

ERASER FOR MECHANICAL PENCILS

Mark E. Savoie, Cleveland, Ohio.

Original No. 2,356,474, dated August 22, 1944, Serial No. 481,895, April 5, 1943. Application for reissue March 2, 1945, Serial No. 580,550

10 Claims. (Cl. 120—38)

This invention relates to a mechanical pencil and has for an object to provide an eraser holder combined with a lead holder and having an actuating mechanism similar to the lead actuating mechanism for feeding the eraser progressively as it becomes worn, so that a usable eraser will be obtainable for approximately the life of the pencil.

A further object is to provide a device of this character in which the eraser holding member forms a magazine for leads when using a flat eraser and the pencil barrel forms a magazine for leads when using a round eraser.

A further object is to provide a device of the character stated in which the eraser holding member, when adapted to hold a cylindrical eraser, has its wall grooved to provide pockets adapted to receive leads.

A further object of this invention is the provision of overlapping the propelling screw shafts of the lead and eraser actuating mechanisms within a common housing to permit adequate actuating movement in both sets of mechanism in a pencil of normal length.

Another object of the invention is the provision of a pencil having a lead actuating mechanism on one end thereof and an eraser actuating mechanism on the other end thereof with a tubular body therebetween into which the propelling screw shafts of the mechanisms extend and there overlap for a portion of their length, whereby a pencil of foreshortened length is obtained.

Another object of the invention is the provision of flexible propelling screw shafts for the lead and eraser actuating mechanisms which overlap for a portion of their length whereby the flexibility of the propelling screw shafts allows them to laterally deflect and clear each other within the tubular body into which they project.

Another object of the invention is the provision of preventing rotation of the propelling screw shafts of both the lead and the eraser actuating mechanisms.

Another object of the invention is the provision of means within the tubular body which contacts the propelling screw shafts for preventing rotation thereof.

Another object of the invention is the provision of an elongated flat hollow tube mounted within the tubular body, the propelling screw shafts of the lead and eraser actuating mechanism being mounted within the elongated flat hollow tube, whereby the propelling screw shafts may engage the side walls of the elongated flat hollow tube to prevent rotation thereof.

A further object is to provide a device of this character in which the eraser holding member is so formed to also function as a magazine for leads without the leads wedging against the eraser.

A further object is to provide a device of this character in which the eraser holding member is so formed to also function as a magazine for leads when using a flat eraser.

A still further object is the provision of a swivel connection between the eraser and the propelling screw, whereby the transfer of a new eraser is easily attached to the screw.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal sectional view, with parts in elevation, of a mechanical pencil constructed in accordance with the invention;

Figure 2 is a longitudinal sectional view of the mechanical pencil taken in a plane at a right angle to the plane of Figure 1;

Figure 3 is a cross-sectional view taken on the line 3—3 of Figure 1;

Figure 4 is a cross-sectional view taken on the line 4—4 of Figure 1;

Figure 5 is a perspective view showing the screw of the eraser propelling and retracting mechanism separated and the means of attaching the eraser to the screw;

Figure 6 is a perspective view showing the cup member of the eraser holding housing, the sleeve, and the member for locking the sleeve to the cup member;

Figure 7 is a longitudinal sectional view of a modified form of the invention;

Figure 8 is a perspective view of the parts of the eraser propelling and retracting mechanism, separated and the means for attaching the eraser to the screw mechanism;

Figure 9 is a perspective view showing the eraser propelling and retracting mechanism, similar to Figure 8, used in connection with a flat eraser;

Figure 10 is a sectional view with parts in elevation of a further modified form of the eraser propelling and retracting mechanism with the eraser clamped in position;

Figure 11 is a sectional view of a still further modified form of the eraser propelling and retracting mechanism with a modified form of the eraser holder;

Figure 12 is a cross-sectional view of the pencil barrel or tubular body similar to Figure 4 and illustrating an alternative method of providing a flat hollow member within the barrel in which the overlapping screws may operate;

Figure 13 is a cross-sectional view taken on the line 13—13 of Figure 7;

Figure 14 is a view of a metal band which fits over the housing member concealing the junction of pencil barrel and housing member; and Figure 15 is a flat development of the clamp shown in Figures 1, 2, 5 and 10.

Referring now to the drawing, 10 designates the barrel or tubular body of a mechanical pencil. In carrying out one form of the invention a tubular housing 11 is provided with a molded axial opening 12 which is of substantially cylindrical formation and which forms a magazine for leads 13, see Figure 3, the opening being provided with a reduced extension 14 of oblong form in cross-section to slidably receive an eraser 15 also of substantially oblong cross-section. The inner wall of the opening 12 of the eraser housing defines in combination with the eraser, elongated spaces constituting lead chambers, which have square shoulders at their outer ends to keep the leads from wedging against the sides of the eraser. As shown in Figure 7, the extension of the axial opening and the eraser may be round in cross-section. The eraser projects into the opening 12, and at the inner end is provided with means to propel and retract the eraser as will now be described.

A cup-shaped member 16 having a cylindrical body is provided internally with screw threads 17 to receive external screw threads 18 on the uniformly reduced inner end of the housing. The member 16 is substantially cylindrical and is flush with the outer surface of the tubular housing 11 and with the outer surface of the barrel 10. A projection 19 which is threaded inside is connected to and extends from the member 16 into the barrel 10 and is surrounded by an annular sleeve 20 of rubber or other material to secure the member 16 to the barrel 10. The projection 19 extends into the sleeve 20 for substantially one-half the length of the sleeve. The outer wall of the sleeve 20 frictionally contacts with the wall of an enlarged axial opening 21 in the barrel 10.

A cone-shaped member 22, having an axial dimension substantially one-half that of the length of the sleeve 20, and fitting in the opening of the sleeve, is provided at its small end with an externally screw threaded hollow shank 22*a* which is threaded into the threaded projection 19 connected to the member 16. The cone-shaped member 22 rotatably connects the sleeve 20 to the member 16, and the sleeve 20 connects the tubular housing 11 to the barrel 10. A flange 23 on the lower end of the cone-shaped member 22 holds the sleeve 20 on the projection 19 of the member 16 and the sleeve is held against accidental displacement from the barrel 10 by its frictional engagement with the barrel. When the barrel 10 is rotated relative to the tubular housing 11, the sleeve 20 rotates about the shank 22*a*. A metal band 10*a* which surrounds the barrel 10 and member 16 conceals the juncture between said parts.

An elongated screw 24 extends through an opening in the member 16 and is threadedly engaged with the threaded wall of an axial opening 25 in the shank 22*a* of the cone-shaped member 22. The screw 24 is provided with a flattened portion 26 which is located within the bore 45 of the barrel 10, and which contacts with the walls of the bore to prevent the screw and barrel from turning one with relation to the other. The screw 24 is connected to the eraser 15 by a clamp 27 which is attached to the eraser by four prongs 27*a*, see Figures 1 and 10. The lower side of the clamp 27 is, as best shown in the flat in Figure 15, provided with an opening 28 through which the upper end of the screw 24 passes. This end of the screw is provided with spherical elements 29 connected by a neck 29*a*, the neck passing through the opening 28, and the spherical elements contacting with the upper and lower surfaces of the lower side of the clamp 27, to swivelly connect the clamp and screw. The clamp 27 is provided with a slot 28*a* to permit the clamp 27 and the screw 24 to be readily assembled. The spherical elements 29 of the screw 24 prevent the screw and the clamp 27 from having any relative axial movement, so as to insure the movement of the eraser 15 when the screw 24 and tubular housing 11 are turned one with relation to the other.

By holding the tubular housing 11 stationary and turning the barrel 10 on its axis, the screw 24 will be turned relative to the shank 22*a* and will feed or move endwise into the opening 12 of the tubular housing 11, since the screw is held against rotation by the flattened portion 26 against the bore 45. During rotation of the barrel in one direction, the eraser 15 will be propelled to project from the housing 11 and during rotation of the barrel in the opposite direction the eraser will be retracted into the housing.

As shown in Figures 1 and 2 of the drawing, the lower end of the pencil is provided with a lead actuating mechanism indicated by the reference character 5 and is provided with a propelling screw shaft 7 which actuates the lead 6 mounted in the lead actuating mechanism 5. The upper end of the propelling screw shaft 7 is provided with a flat portion 8 for engaging the bore 45 of the barrel 10 which prevents relative movement between the screw shaft 7 and the barrel 10. In actuating the lead 6 the barrel 10 is turned relative to the lead actuating mechanism 5 and the shaft 7 pushes or propels the lead 6 outwardly from the lead actuating mechanism. As shown in Figures 1 and 2, the two propelling screw shafts 7 and 24 of the lead actuating mechanism and of the eraser actuating mechanism, respectively, overlap each other whereby a pencil of foreshortened length may be obtained. The propelling screw shafts 7 and 24 are flexible whereby they may be laterally displaced with reference to each other so as not to have interference therebetween as they are moved axially relative to each other. The propelling screw shafts in their retracted position overlap each other for a distance substantially one-half the length of the barrel 10. The amount overlapped as shown in the drawing enables me to provide a pencil having both an eraser and a lead actuating mechanism in a pencil of substantially normal length.

Another form of the eraser is shown in Figures 7 and 8 in which the housing 30 is provided with a cylindrical bore 31 to receive a cylindrical eraser 32. The bore 31, as best shown in Figure 13, is provided with four grooves 31*a* which provide pockets for leads 31b. In this form of the invention the cup-shaped member 16a, sleeve 20a, cone-shaped member 22b, and metal band 10b are the same as previously described and are assembled with the housing 30 and barrel 36 of the pencil as previously described. In Figure 7, the lead actuating mechanism 5 is the same as shown in Figures 1 and 2.

The cylindrical eraser 32 is wedged into a cup-shaped holder 38 having oppositely disposed slots 39 in the sides to make the walls of the holder resilient to clamp the eraser firmly in the holder. The holder is provided in the bottom with a central opening 40. A screw 41 which extends through an opening in the member 16a is threadedly engaged in an axial opening extending through the threaded shank of the cone-shaped member 22b and is held against rotation with relation to the bore of the barrel 36 by a flattened portion 44 which extends into a bore 45 of the barrel. A flattened portion 46 near the outer end of the screw is disposed adjacent to the bore of the holder 38 and the end portion is provided with a hook 47 which is engaged in the opening 40 in the bottom of the cup to swivelly attach the screw to the cup. The flattened portion 46 forms a shoulder to push against the cup when the screw is fed endwise as previously described to propel the eraser out of the housing. Endwise feeding of the screw in the opposite direction causes the hook 47 to retract the eraser into the cup.

As best shown in Figure 11, the operating screw, here designated 24a, may be provided with spherical elements 52 and an intermediate neck 54, the neck passing through the opening 55 in the bottom of the holder 53, and the spherical elements contacting with the upper and lower sides of the bottom of the holder. The holder 53 is provided with a slot 55a to permit the application or removal of the screw 24a.

The eraser of rectangular cross-section shown at 59 in Figure 9 and which is identical to 15 previously described, may be confined in a cup-shaped holder 60 similar to the holder 38 and the operating screw 61 may be provided with a flattened portion 62 and hook 63 similar to the flattened portion 46 and hook 47 previously described.

The rectangular shape of the bore in the barrel may, as shown in Figure 12, be produced by an elongated flat hollow tube 64 which is confined in the barrel 65 to receive the operating screws 7 and 24, respectively, of lead and eraser actuating mechanisms, in order to non-rotatably mount the operating screws in the barrel.

In all forms of the invention the operating screws are fed endwise and are operatively connected to the lead and eraser mechanism through the various forms of connections heretofore described. The swivel connections between the eraser and the propelling screw are easily disconnected and connected, whereby the transfer of a new eraser is an easy operation.

From the above description it is thought that the construction and operation of the invention will be fully understood without further explanation.

What is claimed is:

1. In combination with a pencil barrel, a sleeve frictionally fitted in the rear end of the barrel, an interiorly threaded tubular shank member extended through the bore of the sleeve, said shank member having an exteriorly threaded portion projecting outwardly of the barrel and sleeve and having an enlarged inner end portion holding the shank member against outward displacement of the sleeve, a cylindrical member mounted in end-to-end relation with the sleeve and having an opening therethrough substantially co-axial with the bore of said shank member, said cylindrical member being provided with an enlarged interiorly threaded counter bore engaging the projecting portion of the shank member, that end of the cylindrical member remote from the sleeve having an interiorly threaded socket, a tubular eraser housing having its inner end exteriorly threaded and engaging said socket, a screw extended through the opening in the cylindrical member and threadedly engaging the bore of said shank member, said screw having a broad longitudinally flattened end slidably received in the barrel, means in the barrel to prevent rotation of said flat end, an eraser disposed for axial sliding movement in said housing, and a clamp attached to the inner end of the eraser and having swivel connection with the screw.

2. In combination with a pencil barrel, a sleeve fitted in the end of the barrel, a cylindrical member mounted in end-to-end relation with the sleeve and having an opening therethrough, a hollow shank member extending through the bore of the sleeve and connected to the cylindrical member, said shank member having a bore extending therethrough and provided with internal threads therein, and having an enlarged inner end portion holding the shank member against displacement outward of the sleeve, a tubular eraser housing having its inner end connected to the cylindrical member, a propelling screw extending through the opening in the cylindrical member and threadably engaging the internal threads provided in the bore of the shank member, cooperating means carried by said barrel and said screw for turning said screw as said barrel is rotated, an eraser disposed for axial sliding movement in said tubular housing, and a clamp attached to the inner end of the eraser and having swivel connection with the screw.

3. In combination with a pencil barrel, a sleeve fitted in the end of the barrel, a cylindrical member mounted in end-to-end relation with the sleeve and having an opening therethrough, a hollow shank member extending through the bore of the sleeve and being threadably connected to the cylindrical member, said shank member having a threaded bore extending therethrough and having an enlarged inner end portion holding the shank member against outward displacement of the sleeve, a tubular eraser housing having its inner end connected to the cylindrical member, a propelling screw extending through the opening in the cylindrical member and threadably engaging the internal threads provided in the bore of the shank member, cooperating means carried by said barrel and said screw for turning said screw as said barrel is rotated, an eraser disposed for axial sliding movement in said tubular housing, and a clamp attached to the inner end of the eraser and having swivel connection with the screw.

4. In a pencil having a slidably mounted eraser and a propelling screw shaft for slidably actuating the eraser, the improvement of a swivel connection between the screw shaft and the eraser, said swivel connection comprising a clamp for engaging the eraser, said clamp having a transversely disposed portion spaced from the end of the eraser and having an aperture therethrough, said screw having an L-shaped end portion including a stem having a laterally extending bent part, said stem also having a flattened part spaced from said laterally extending bent part, said laterally extending bent part and said flattened part constituting, respectively, first and second spaced engagement means, said laterally extending bent part of the L-shaped portion being adapted to be manually inserted through said aperture, said laterally extending bent part of the L-shaped portion after insertion through said aperture being disposed on one side of the transversely disposed portion of the clamp and the said flattened part being disposed on the other side thereof with the stem passing through said aperture.

5. In a pencil having a slidably mounted eraser and a propelling screw shaft for slidably actuating the eraser, the improvement of a swivel connection between the screw shaft and the eraser, said swivel connection comprising a clamp for engaging the eraser, said clamp having a transversely disposed portion spaced from the end of the eraser and having an aperture therethrough, said screw having an L-shaped end portion including a stem having at the end thereof a first laterally extending engagement part and having at a spaced distance from the end thereof a second laterally extending engagement part, said first laterally extending engagement part of the L-shaped portion being adapted to be manually inserted through said aperture, said first laterally extending engagement part of the L-shaped portion after insertion through said aperture being disposed on one side of the transversely disposed portion of the clamp and said second laterally extending engagement part being disposed on the other side thereof with the stem passing through said aperture.

6. An improved pencil having a mechanical lead actuating mechanism at one end thereof and having an eraser actuating mechanism at the opposite end thereof, a tubular body extending therebetween, said tubular body having substantially a straight bore, said lead actuating mechanism having a propelling screw shaft extending therefrom into the bore of said tubular body, said eraser actuating mechanism having a propelling screw shaft extending therefrom into the bore of said tubular body, cooperative means carried by said tubular body and said screws for turning said screws respectively as said tubular body is rotated relative to said lead actuating mechanism and said eraser actuating mechanism, said propelling screw shafts being axially coextensive and contacting each other over a portion of their length in their retracted position whereby a pencil of foreshortened length is obtained.

7. An improved pencil having a mechanical lead actuating mechanism at one end thereof and having an eraser actuating mechanism at the opposite end thereof, a tubular body extending therebetween, said tubular body having substantially a straight bore, said lead actuating mechanism having a flexible propelling screw shaft extending therefrom into the bore of said tubular body, said eraser actuating mechanism having a flexible propelling screw shaft extending therefrom into the bore of said tubular body, cooperative means carried by said tubular body and said screws for turning said screws respectively as said tubular body is rotated relative to said lead actuating mechanism and said eraser actuating mechanism, said propelling screw shafts being axially coextensive and contacting each other over a portion of their length whereby a pencil of foreshortened length is obtained.

8. An improved pencil having a mechanical lead actuating mechanism at one end thereof and having an eraser actuating mechanism at the opposite end thereof, a tubular body extending therebetween, said tubular body having substantially a straight bore, said lead actuating mechanism having a propelling screw shaft extending therefrom into the bore of said tubular body, said eraser actuating mechanism having a propelling screw shaft extending therefrom into the bore of said tubular body, cooperative means carried by said tubular body and said screws for turning said screws respectively as said tubular body is rotated relative to said lead actuating mechanism and said eraser actuating mechanism, said propelling screw shafts being of substantially equal length and being axially coextensive and contacting each other in said tubular body for a distance substantially equal to one-half the length of the tubular body, and an eraser for said pencil of a length substantially equal to the length which said screw for the eraser actuating mechanism extends into said tubular body.

9. An improved pencil having a mechanical lead actuating mechanism at one end thereof and having an eraser actuating mechanism at the opposite end thereof, a tubular body extending therebetween, said tubular body having substantially a straight bore, said lead actuating mechanism having a flexible propelling screw shaft extending therefrom into the bore of said tubular body, said eraser actuating mechanism having a flexible propelling screw shaft extending therefrom into the bore of said tubular body, said propelling screw shafts being axially coextensive and contacting each other over a portion of their length in said tubular body, said propelling screw shafts having means thereon engageable with said tubular body to prevent rotation of said screws relative to said tubular body, said pencil having a foreshortened length substantially equivalent to the amount of axial coextension of said screws.

10. An improved pencil having a mechanical lead actuating mechanism at one end thereof and having an eraser actuating mechanism at the opposite end thereof, a tubular body extending therebetween, said tubular body having substantially a straight bore, an elongated flattened tube in the bore of said tubular body, said lead actuating mechanism having a propelling screw shaft extending therefrom into said flattened tube, said eraser actuating mechanism having a propelling screw shaft extending therefrom into said flattened tube, said propelling screw shafts being axially coextensive and contacting each other over a portion of their length in their retracted position, whereby a pencil of foreshortened length is obtained, said screw shaft having means thereon engageable with said flattened tube for turning said screws as said barrel is rotated.

MARK E. SAVOIE.